(12) United States Patent
Anson

(10) Patent No.: US 10,885,164 B2
(45) Date of Patent: *Jan. 5, 2021

(54) LOGIN PROCESS FOR MOBILE PHONES, TABLETS AND OTHER TYPES OF TOUCH SCREEN DEVICES OR COMPUTERS

(71) Applicant: NOWWW.US PTY LTD., Darlington (AU)

(72) Inventor: Mark Rodney Anson, Darlington (AU)

(73) Assignee: NOWWW.US Pty Ltd., Darlington (AU)

( * ) Notice: Subject to any disclaimer, the term of this patent is extended or adjusted under 35 U.S.C. 154(b) by 170 days.

This patent is subject to a terminal disclaimer.

(21) Appl. No.: 16/136,499

(22) Filed: Sep. 20, 2018

(65) Prior Publication Data

US 2019/0018938 A1 Jan. 17, 2019

Related U.S. Application Data

(63) Continuation of application No. 14/296,350, filed on Jun. 4, 2014, now Pat. No. 10,120,989.

(60) Provisional application No. 61/835,559, filed on Jun. 15, 2013.

(30) Foreign Application Priority Data

Jun. 4, 2013 (AU) .............................. 2013902015

(51) Int. Cl.
*G06F 21/36* (2013.01)
*G06F 21/31* (2013.01)

(52) U.S. Cl.
CPC .................................... *G06F 21/31* (2013.01)

(58) Field of Classification Search
CPC .......... G06F 21/31; G06F 21/32; G06F 21/36; H04L 63/0428; H04W 12/06; H04W 12/08
USPC ..................................... 726/5, 7, 19; 713/183
See application file for complete search history.

(56) References Cited

U.S. PATENT DOCUMENTS

| | | | | |
|---|---|---|---|---|
| 5,821,933 A | * | 10/1998 | Keller | G06F 3/04817 715/741 |
| 7,657,849 B2 | * | 2/2010 | Chaudhri | G06F 3/04883 715/863 |
| 8,504,842 B1 | * | 8/2013 | Meacham | G06F 3/0488 713/182 |
| 8,638,939 B1 | * | 1/2014 | Casey | G06F 21/36 380/277 |

(Continued)

FOREIGN PATENT DOCUMENTS

| | | | |
|---|---|---|---|
| AU | 2013101012 A4 * | 8/2013 | |
| AU | 2014203047 A1 * | 12/2014 | ............. G06F 21/31 |
| JP | 2000035842 A * | 2/2000 | |

OTHER PUBLICATIONS

Prasad, iCrux—an Artificially Intelligent Virtual Screen Technology, International Conference and Worksho0 on Emerging Trends in Technology (ICWET 2011)—TCET, Mumbai, India, 6 pages. (Year: 2011).*

(Continued)

*Primary Examiner* — Kari L Schmidt
*Assistant Examiner* — Walter J Malinowski
(74) *Attorney, Agent, or Firm* — Rosenberg, Klein & Lee

(57) ABSTRACT

A process including: displaying icons used for password entry into an electronic system, in such a way that a hand movement associated with entry of the password into the system is randomized.

20 Claims, 19 Drawing Sheets

(56) References Cited

U.S. PATENT DOCUMENTS

| | | | | |
|---|---|---|---|---|
| 8,661,369 | B2* | 2/2014 | Heo | G06F 3/0482 715/864 |
| 8,756,672 | B1* | 6/2014 | Allen | G06F 21/36 345/173 |
| 2004/0034801 | A1* | 2/2004 | Jaeger | G06F 3/0481 726/6 |
| 2008/0028916 | A1* | 2/2008 | Shimizu | G09B 15/00 84/477 R |
| 2009/0313567 | A1* | 12/2009 | Kwon | G06F 3/0482 715/769 |
| 2011/0312387 | A1* | 12/2011 | Heo | G06F 3/0482 455/566 |
| 2012/0082306 | A1* | 4/2012 | Hulse | G06F 21/36 380/28 |
| 2012/0272311 | A1* | 10/2012 | Althammer | G06F 21/36 726/16 |
| 2012/0299701 | A1* | 11/2012 | Zou | G06K 9/50 340/5.54 |
| 2013/0078951 | A1* | 3/2013 | Mun | H04M 1/72522 455/411 |
| 2013/0275901 | A1* | 10/2013 | Saas | G06F 3/04812 715/769 |
| 2014/0015786 | A1* | 1/2014 | Honda | G06F 3/04886 345/173 |
| 2014/0181957 | A1* | 6/2014 | Nguyen | G06F 21/36 726/19 |
| 2014/0195974 | A1* | 7/2014 | Ballard | G06F 21/36 715/825 |

OTHER PUBLICATIONS

Biddle, User Study, Analysis, and Usable Security of Passwords Based on Digital Objects, IEEE Transactions on Information Forensics and Security, vol. 6, No. 3, Sep. 2011, pp. 970-979. (Year: 2011).*

Drag and drop objects and return them to their original position, iphone, Stack Overflow, Nov. 11, 2011, 6 pages. (Year: 2011).*

Renaud, Karen, and Antonella De Angeli. "Visual passwords: cure-all or snake-oil?." Communications of the ACM 52, No. 12 (2009): 135-140. (Year: 2009).*

Pandey, Sanjay, Raj Motwani, Palak Nayyar, and Chaitanya Bakhtiani. "Multiple access point grid based password scheme for enhanced online security." (2013): 4-02. (Year: 2013).*

* cited by examiner

LOGIN PROCESS FOR MOBILE PHONES, TABLETS AND OTHER TYPES OF TOUCH SCREEN DEVICES OR COMPUTERS

CROSS-REFERENCE TO RELATED APPLICATIONS

This application is a continuation of U.S. patent application Ser. No. 14/296,350, filed on Jun. 4, 2014. Application Ser. No. 14/296,350 claims priority to Australian Patent Application No. 2013902015, filed Jun. 4, 2013; and U.S. Provisional Patent Application No. 61/835,559, filed Jun. 15, 2013. Each of these applications is hereby incorporated by reference as though fully set forth herein.

BACKGROUND OF THE INVENTION

Technical Field

The present invention pertains to the field of computer system security.

Background Art

Passwords used for electronic login systems are used to secure computer systems and other electronic systems. However, despite advances in encryption, providing a secure login system remains an ongoing problem.

SUMMARY OF THE INVENTION

General problems with the background art, as identified by the inventor, include: the vulnerability of electronic security systems to persons who upon seeing a hand movement associated with password entry into a keyboard are able to guess the password.

Specific problems with the background art, as identified by the inventor, include: central to the inventor's discovery is the realization by the inventor that "standardized" keypad layouts used for password entry on mobile phones, banking terminals and other points of entry into electronic systems, create a security risk, for even if the complete details of a password, used to enter the system, are not seen by a person attempting to steal the password by watching a person enter the password, the standardized layout of keypads used for password entry coupled with observed hand movements means that the person attempting to steal the password can often guess the password on a trial and error basis with little more information than that gleaned from observing the general pattern of hand movements used to enter the password.

Technical Problem

To ameliorate some of the effects of the general problems and the specific problems as recited above and in particular to provide, at least in part, a method to minimize the prospect of password theft by persons who have observed, at least in part, the hand movements associated with password entry.

Technical Solution

Providing a plurality of non-standard keypad layouts, including in one embodiment, randomised layouts, so as to minimize the prospects of an unauthorized person who observed, at least in part, the hand movements used to enter the password, from guessing the complete password.

Advantageous Effects

Advantageous effects include: reducing the risk of a person guessing a password based upon the person having observed, at least in part, a sequence of hand movements used to enter the password.

Accordingly, the invention provides an electronic system including: means for providing secure password entry into the system, by displaying, in an irregular manner, a plurality of symbols used to enter the password, where the symbols appear on an electronic screen of a device connected to the system.

DETAILED DESCRIPTION OF THE PREFERRED EMBODIMENTS

The description in the body of the specification pertains to 'preferred' modes of invention. Accordingly, features recited in the body of the specification should not be construed to be essential features of the invention unless explicitly indicated. Further, any reference in the body of the specification to the expression 'invention' should be construed to imply a reference to preferred embodiments.

The word "random" as used in the context of the display of icons for purposes of password entry into a computer system is meant to denote an arrangement of icons that are irregular to the extent that hand movements associated with password entry are non-predictable when viewed in the context of password entry systems in routine industrial use.

The word "symbol" is taken to include any mark, geometric image, pictographic image, letter, number or other graphical image used to represent something (adapted from the Macmillan Dictionary).

Figure 1:
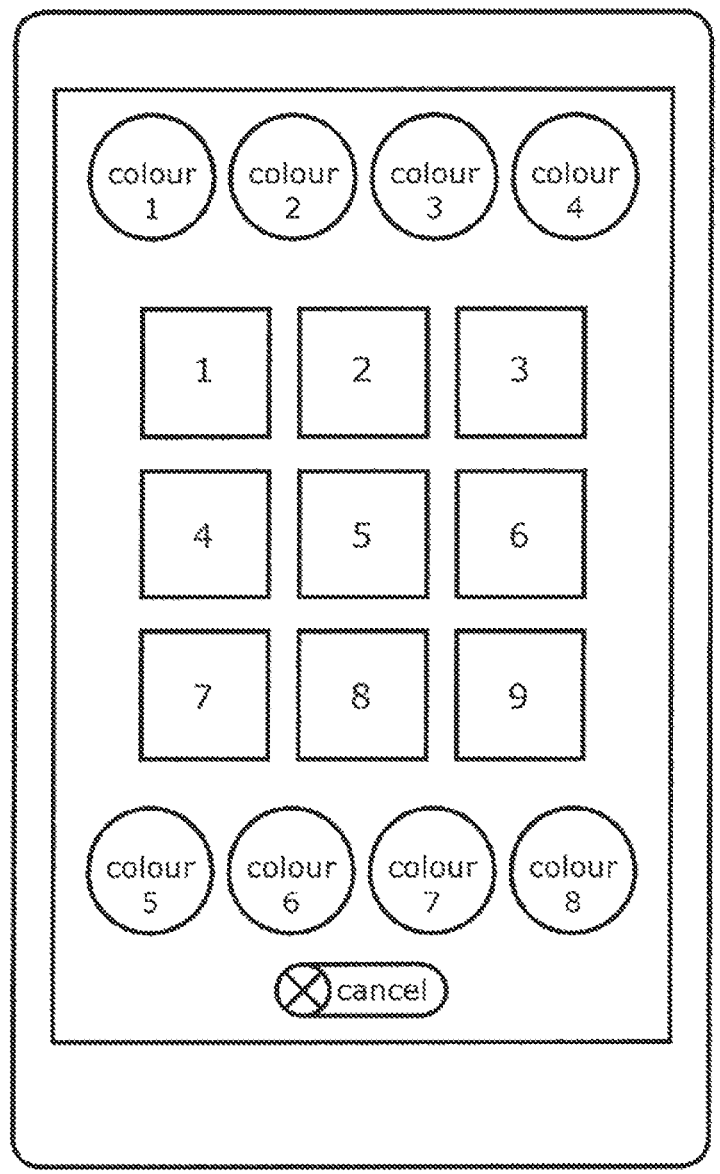
FIG. 1 discloses an embodiment of a login display screen that features colours in circles that can be associated with numbers in squares for password login purposes.
Figure 2:
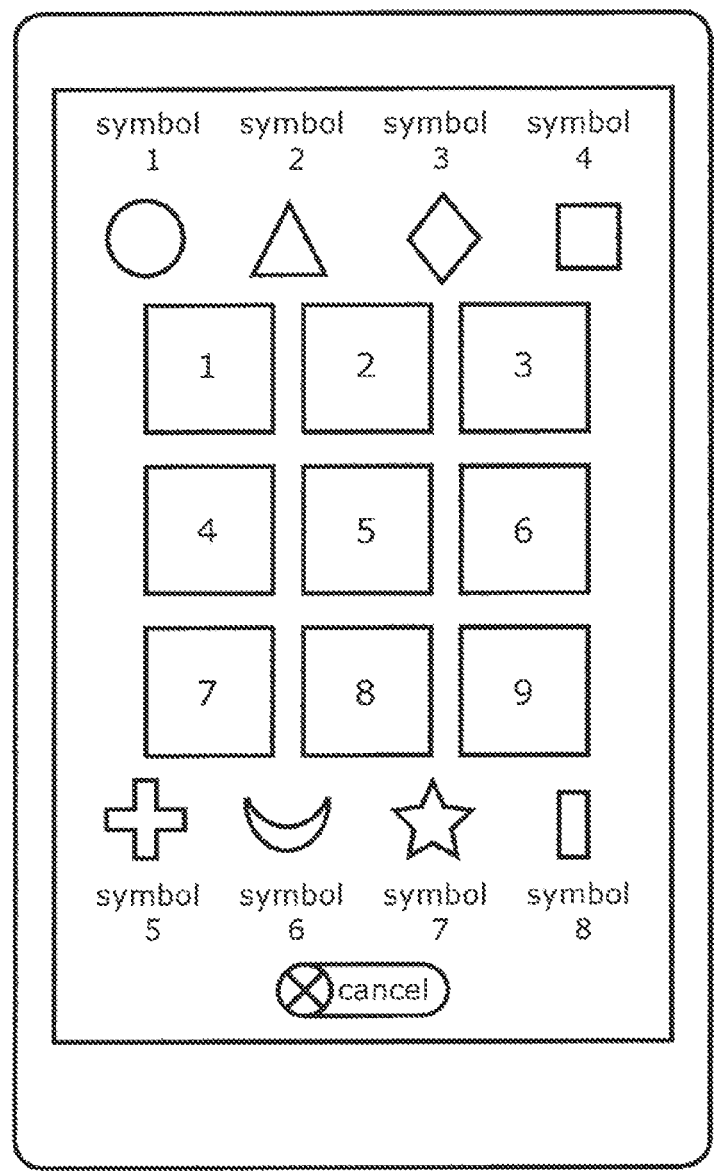
FIG. 2 discloses an embodiment of a login display screen that features symbols that can be associated with numbers in squares.
Figure 3:
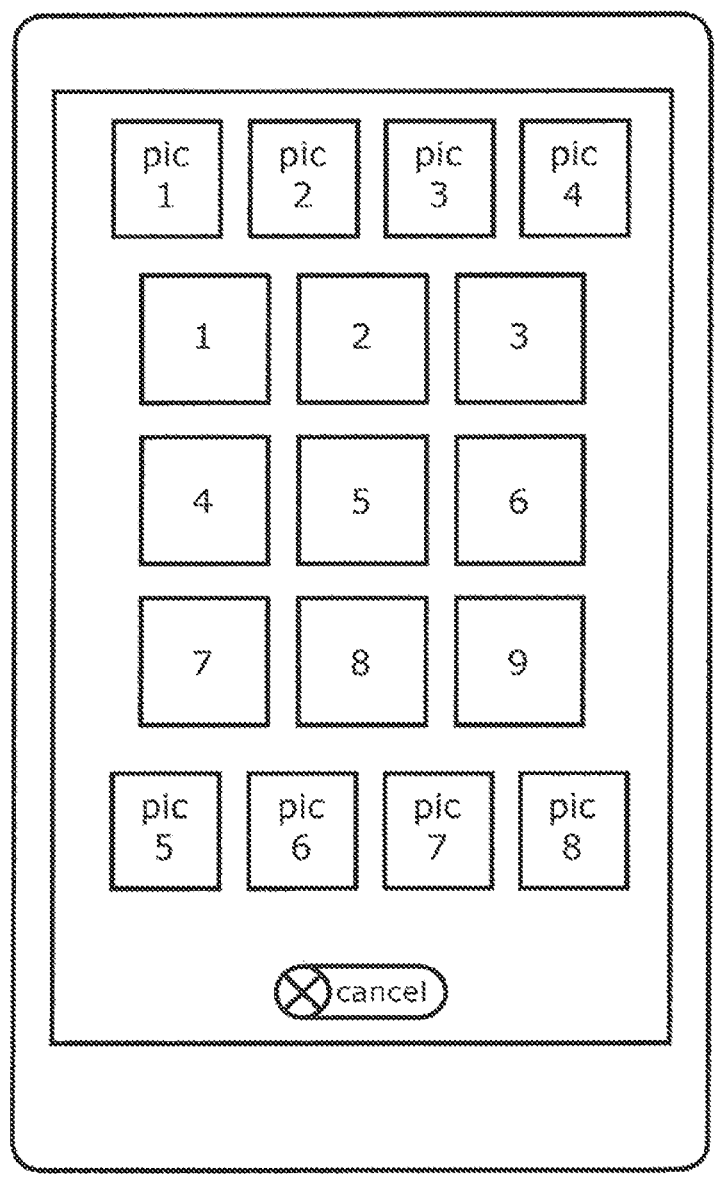
FIG. 3 shows a login display screen having pictures and numbers.
Figure 4:
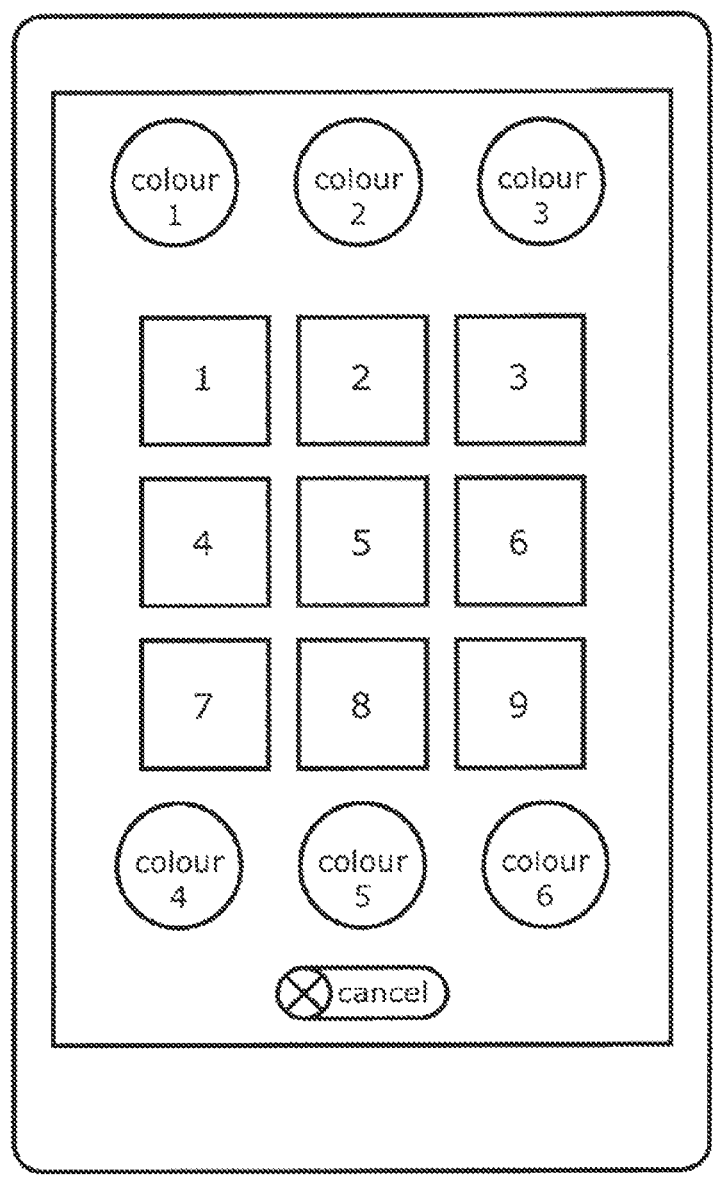
FIG. 4 shows a login display screen having colours and numbers.
Figure 5:
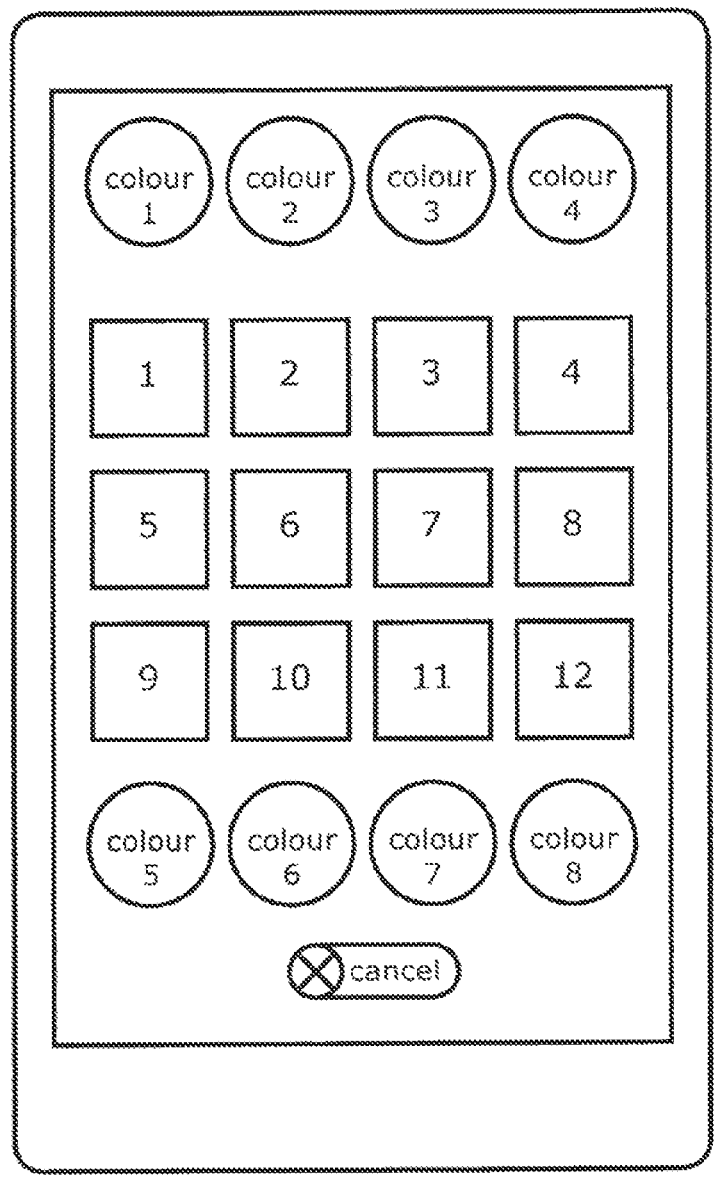
FIG. 5 shows a login display screen having more colours and numbers than those displayed in FIG. 4 (an extended range).
Figure 6:
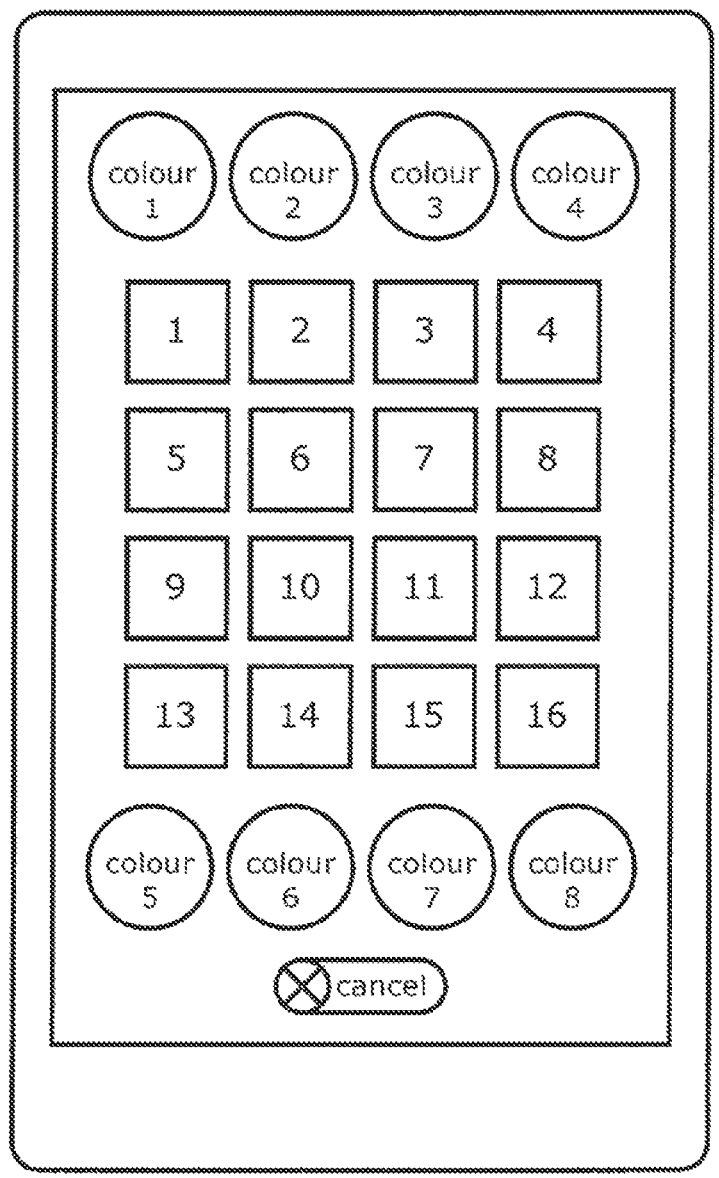
FIG. 6 shows a login display screen having more colours and numbers than those displayed in FIG. 5 (a further extended range).
Figure 7:
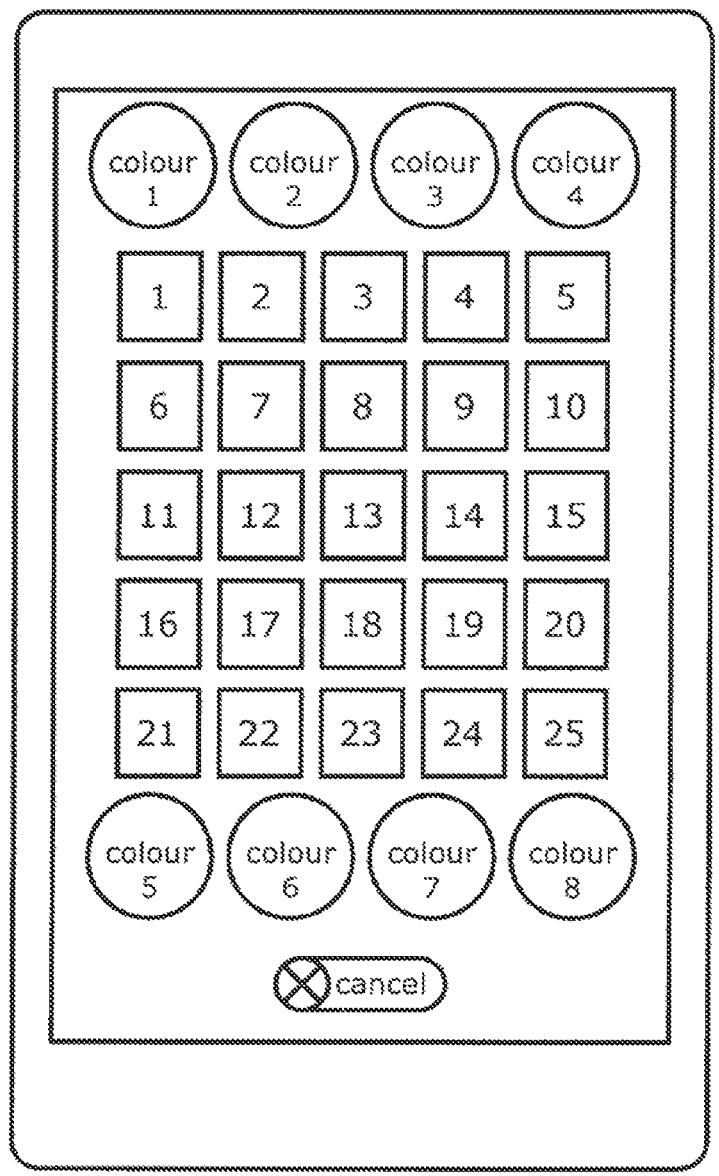
FIG. 7 shows a login display screen having more colours and numbers than those displayed in FIG. 6 (another further extended range).

FIG. 1 illustrates a preferred embodiment of the present invention. A plurality of squares containing numbers as well as circles containing colours are displayed to a user. The user can touch a circular object, for example Colour 1, which can be red and then drag his\her finger on the touchscreen onto the square box "8" for example. Square box "8" then glows red for an instant to advise the user of his\her selection sequence. The user can then touch the square box "7" and drag his\her finger across the touchscreen to the circular object being colour 3 (in one selection sequence), which is blue. Within the colour 3 circle the number "7" is visible for a moment and then the number "7" disappears (once again to advise the user of his\her selection choice). This completes a particular user action sequence. The input data of the user consisting of "Red", "8", "7", "Blue" is processed by the computer system and compared with a predefined password sequence that is required for the user to gain access to the system.

The system will determine if the user has entered the correct password sequence and if the correct password has been entered the system can grant the user access to a mobile phone device (in one preferred embodiment).

When a user drags and drops a "5" onto the red circular object, the computer system can optionally produce an audible sound that the user can hear signifying that the computer system has recognized that an action has been completed by the user.

In the case of a user input action sequence such that the action includes a swiping movement going from "1" to "6" within the grid of icons, the system can also provide, in one embodiment, visual feedback to the user by way of displaying the numeral "1" momentarily at the end point of the swipe, that is, the grid point where "6" is usually displayed (to demonstrate the link between numerals "1" and "6").

Other types of layouts showing arrays of symbols, numbers, images (pictures) and colours are depicted in FIGS. 2 to 16, these illustrations pertain to various login procedures that follow similar principles to the login procedure just described.

FIGS. 2-7 pertain to methods for associating colours, symbols and pictures with numbers (with the illustrated potential to vary the number of items being displayed on any login display screen).

Figure 8:
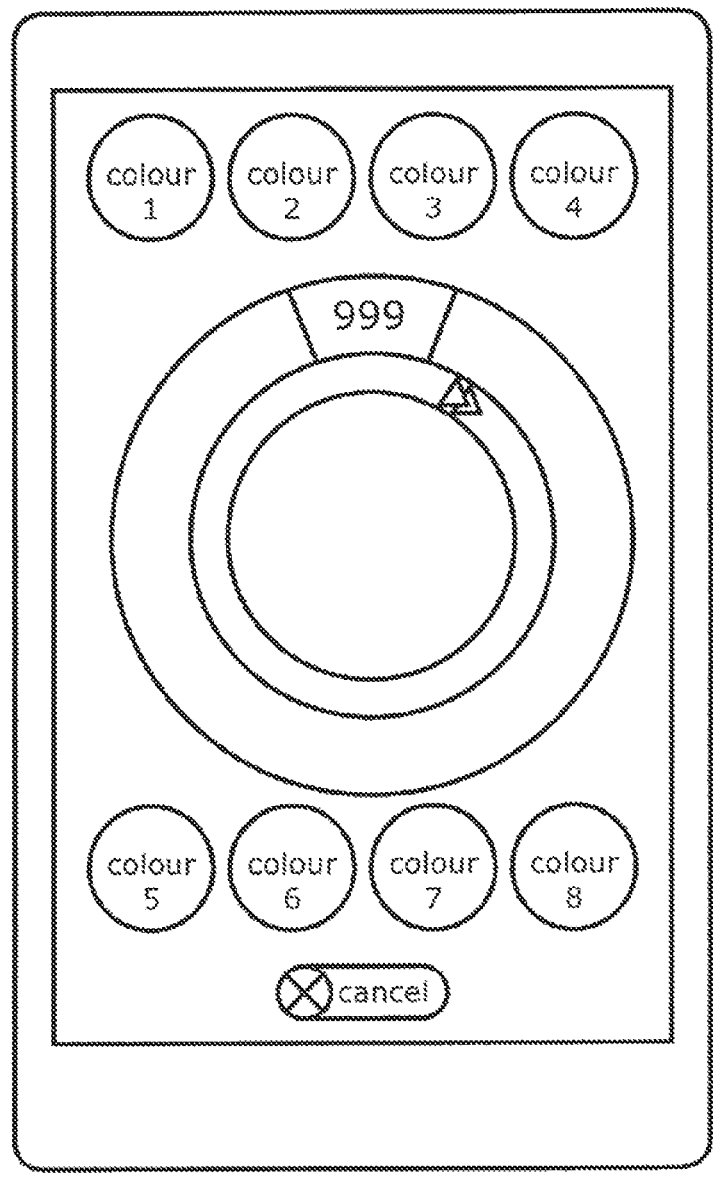
FIG. 8 shows a login display screen in which numbers can be displayed as a result of rotation of a centrally located wheel.

FIG. 8 shows a device where the number is displayed through rotation of a wheel (the number then potentially being associated with a colour).

Figure 9:
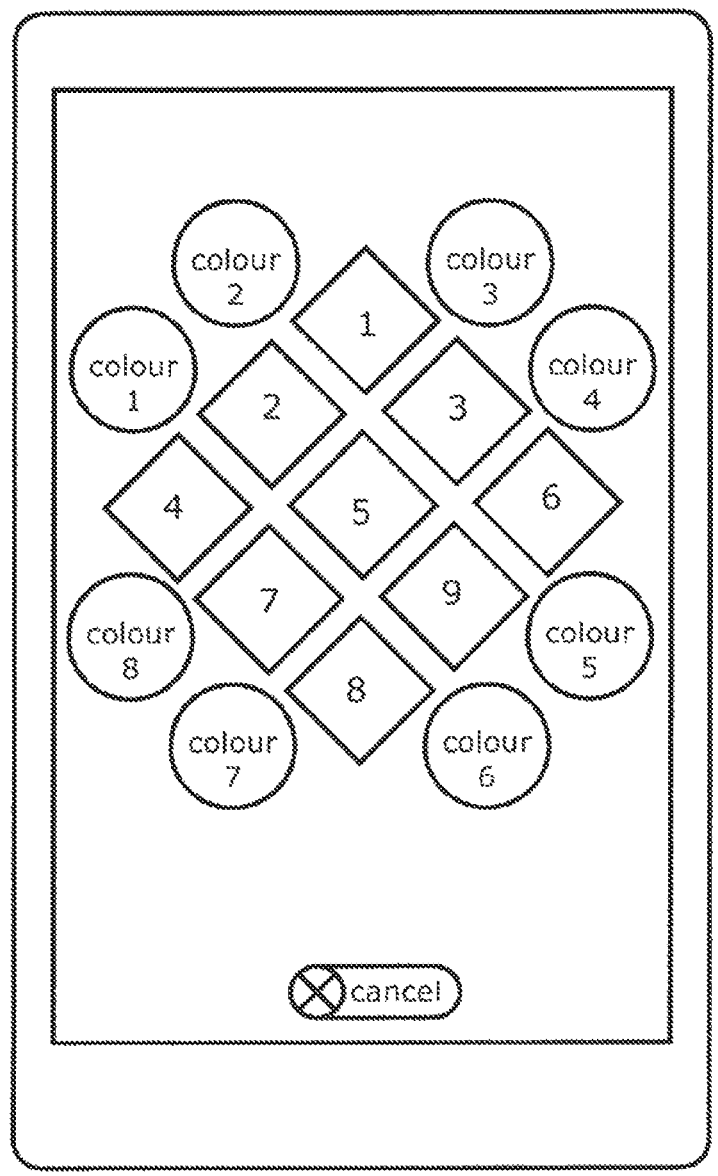
FIG. 9 shows a login display screen in which numbers are displayed in the form of a diamond with associated surrounding colours in circles.
Figure 10:
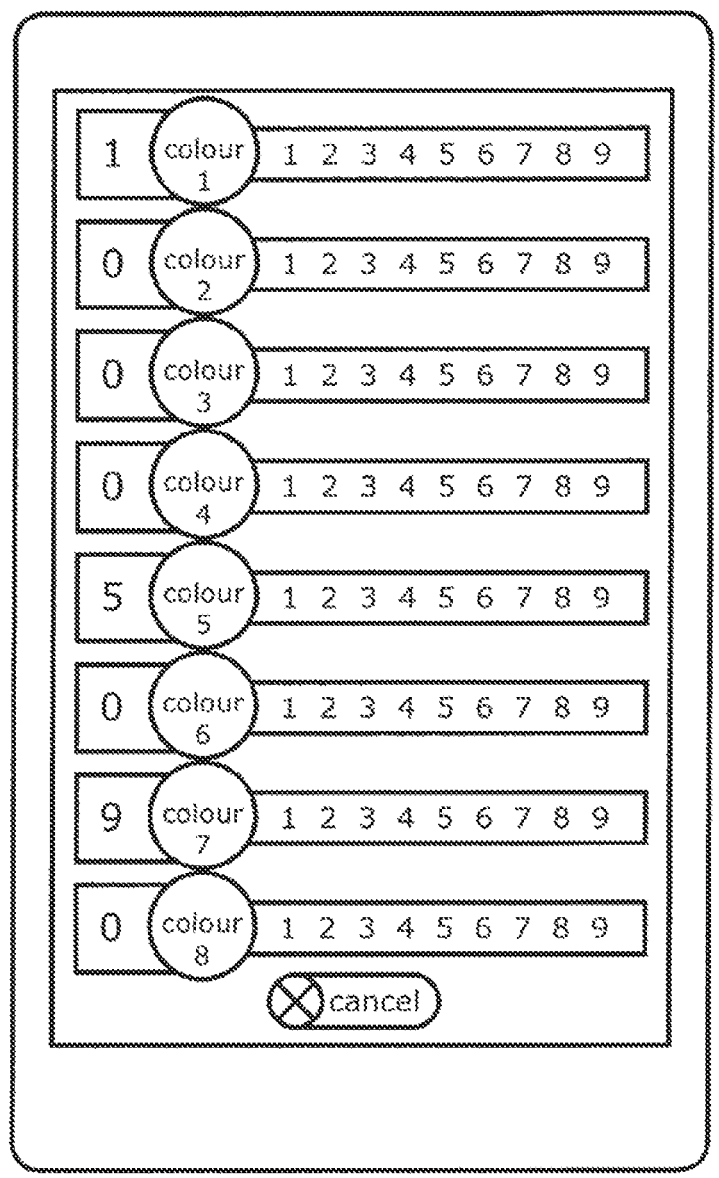
FIG. 10 shows a login display screen in which a horizontal slide is used to associate a colour with an underlying number.
Figure 11:
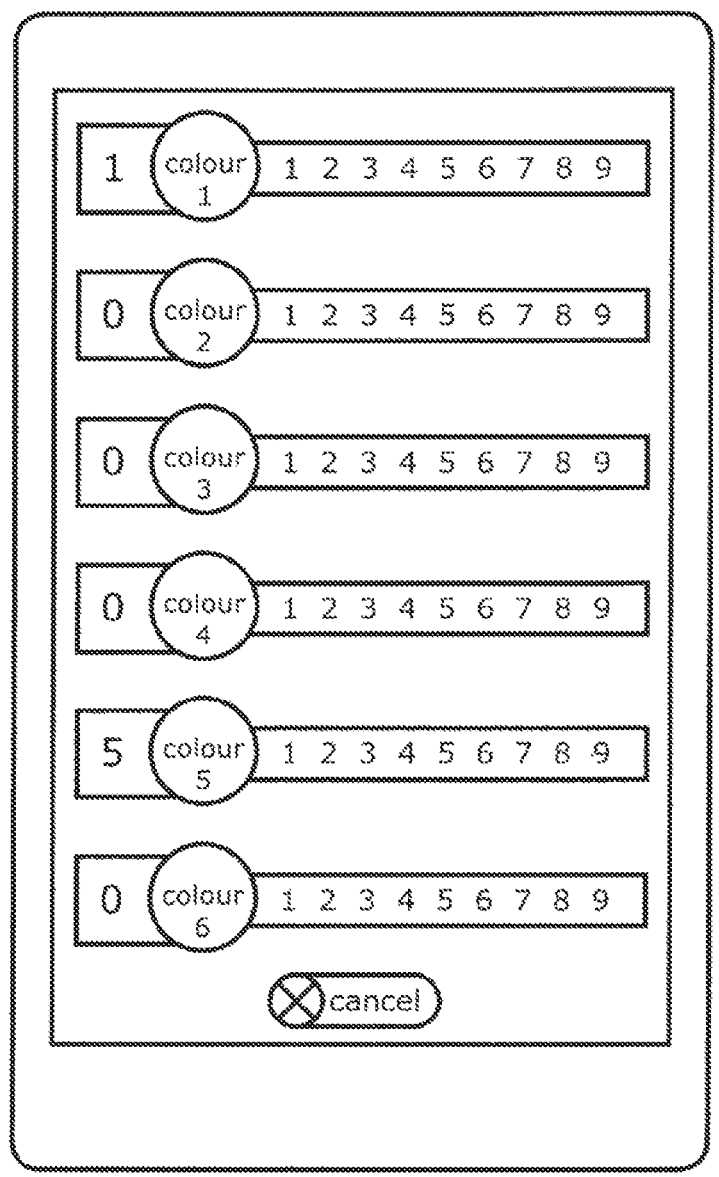
FIG. 11 shows a login display screen in which another horizontal slide is used to associate a colour with an underlying number (fewer rows are seen here than in FIG. 10).
Figure 12:
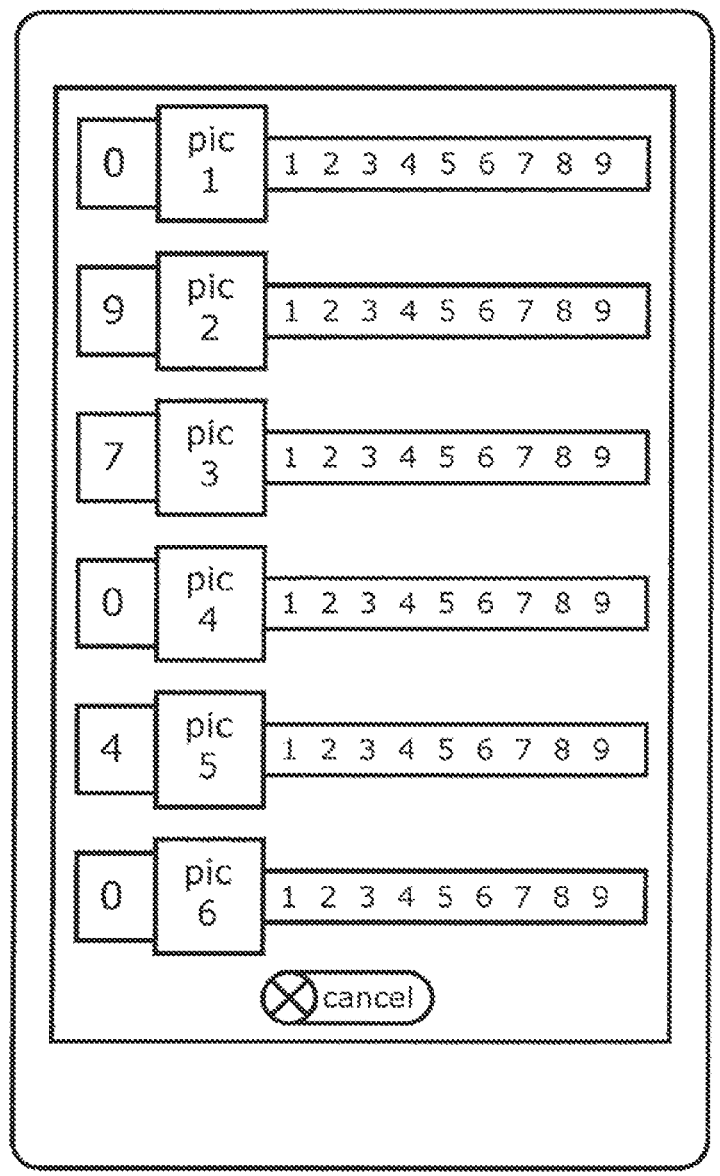
FIG. 12 shows a login display screen in which a horizontal slider features a picture on the slider (the picture can then be associated with an underlying number for password entry purposes).
Figure 13:
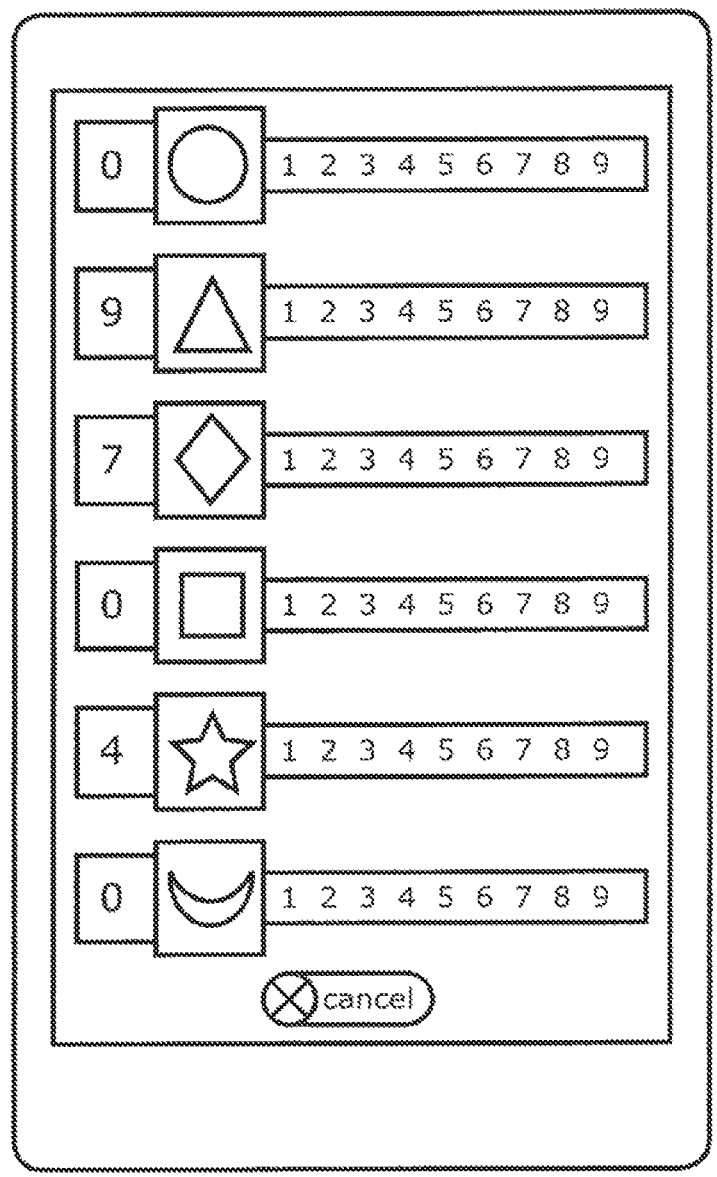
FIG. 13 shows a login display screen in which a horizontal slider features a geometric shape on the slider.

FIG. 9 shows numbers arranged together in the form of a diamond that can be associated with surrounding colours.

FIGS. 10-13 show colours, pictures and symbols that appear on a horizontal slider for purposes of association with underlying numbers.

Figure 14:
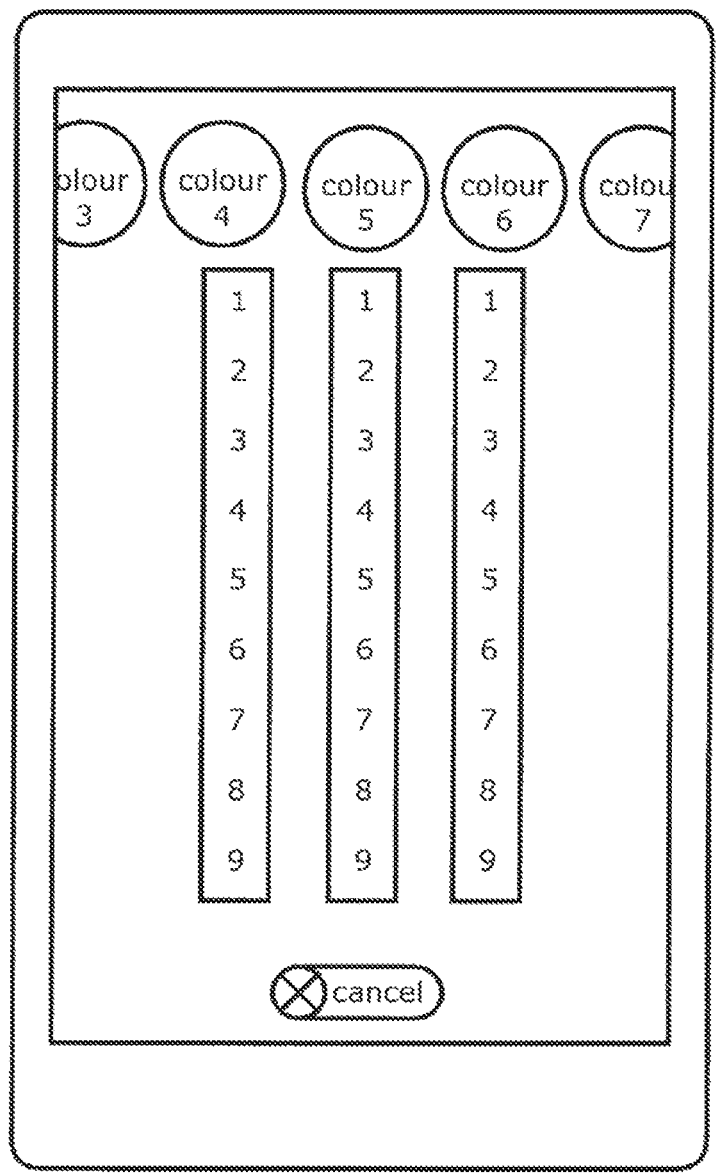
FIG. 14 shows a login display screen in which a colour can be can be moved to a position over a vertical column of numbers so as to associate the colour with a number selected from the column.
Figure 15:
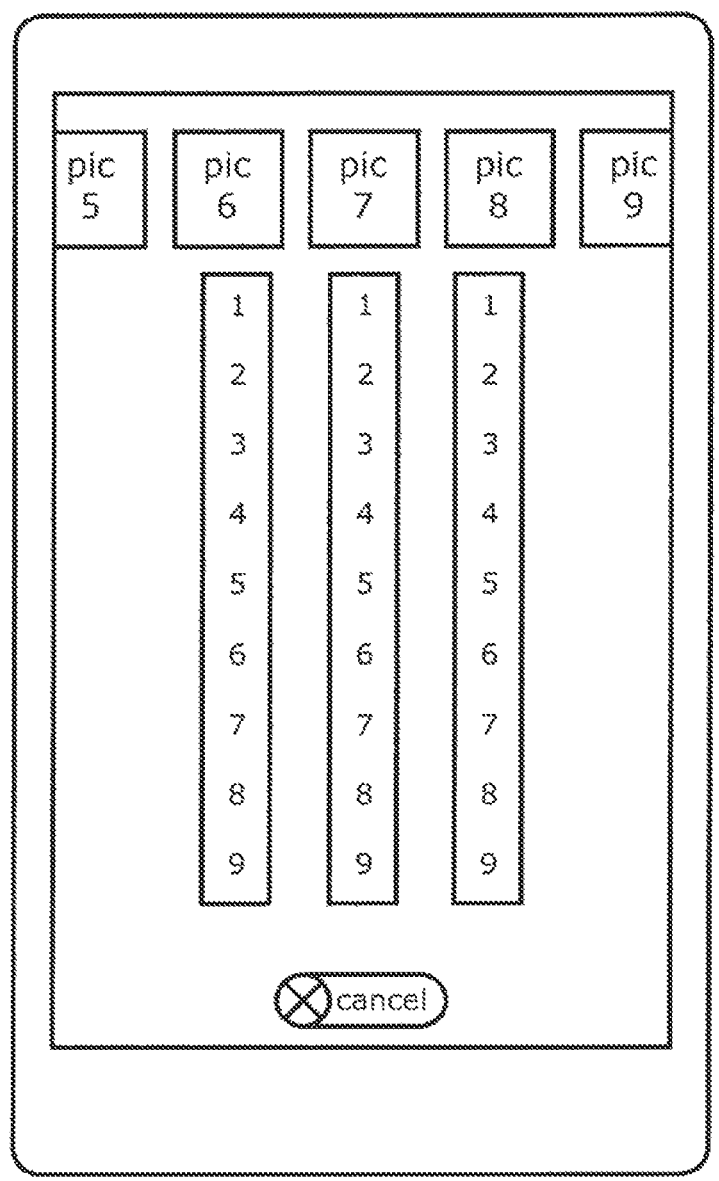
FIG. 15 shows a login display screen in which a picture can be can be moved to a position over a vertical column of numbers so as to associate the picture with a number selected from the column.
Figure 16:
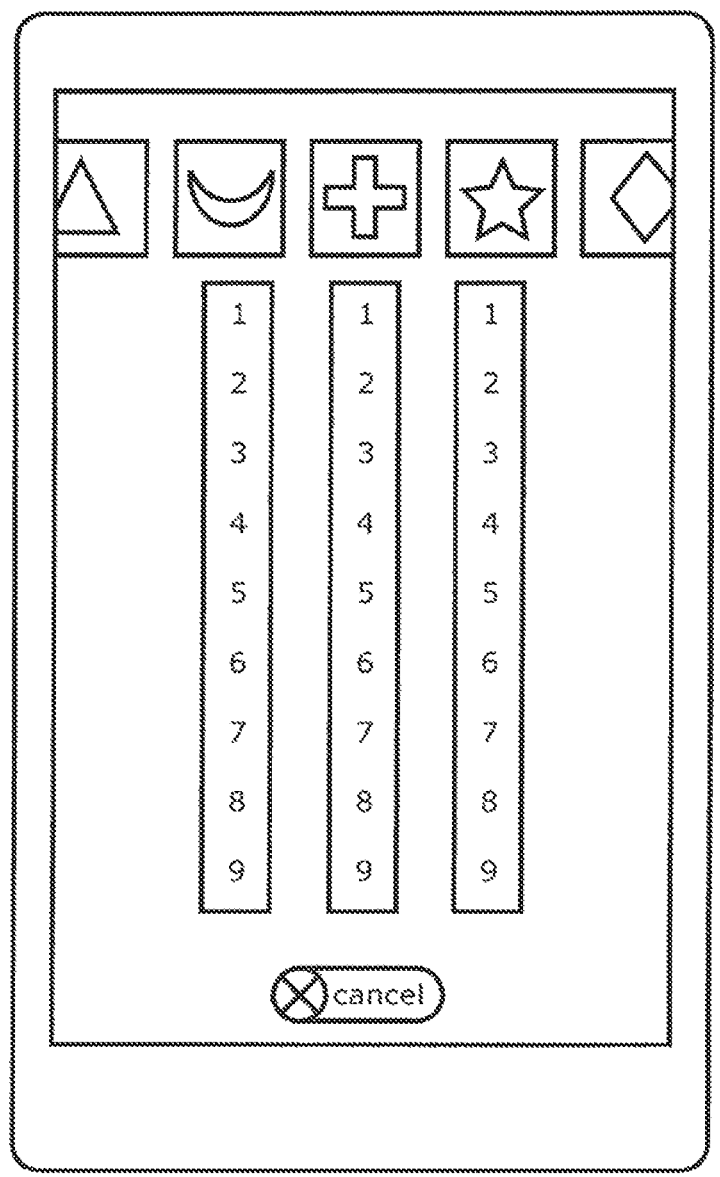
FIG. 16 shows a login display screen in which a geometric symbol can be can be moved to a position over a vertical column of numbers so as to associate the symbol with a number selected from the column.

FIGS. 14-16 show items being colours, pictures and symbols that can each be moved to a position over an underlying vertical column of numbers for purposes of associating one of the items with a number selected from the vertical column.

Figure 17:
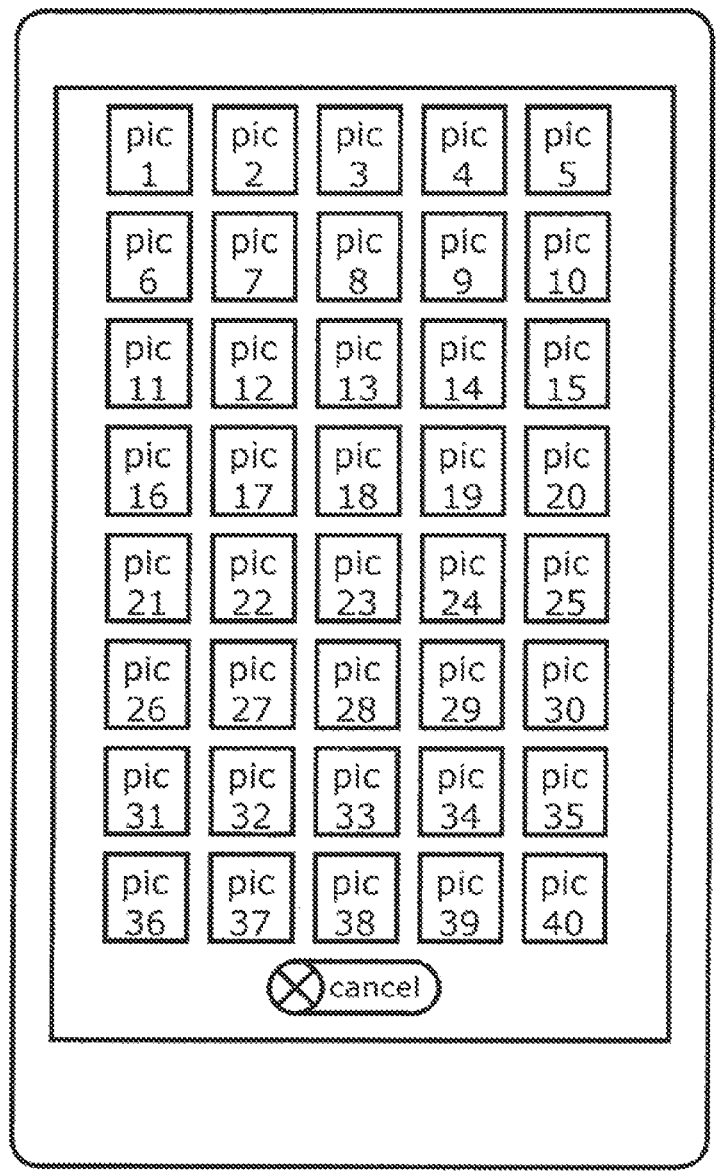
FIG. 17 shows a login display screen in which a plurality of pictures can be selected so as to define a login password.

FIG. 17 shows an interface in which a picture can be touched and slid on top of another picture, so that pic12 can, in one password sequence, be dropped onto pic33 to define a password entry sequence.

In a further preferred embodiment that can be illustrated by reference to FIG. 1, the user input action can be in the form of a drag and drop motion beginning with the number "1" and finishing with the colour "red". Alternatively, the input action can be performed using a stylus or finger by tapping "1" and then tapping the colour "red", or by swiping (maintaining screen contact for at least part of the password entry) with a stylus or finger from the number "1" to the colour "red".

Further, a finger swiping movement can occur such that when reaching the "red" point on the grid the action pauses for a moment and then after this momentary pause the finger can move on to another position in the grid such as position "4". The computer system can optionally have settings, which can be configured to recognize events including a momentary pause or to ignore the pause and only register the start and end points of a user's swipe or drag and drop movements.

In a different embodiment, the software determining the validity of user input is not present on the mobile device itself but instead is located, for enhanced security, within the core network service of the mobile phone service provider.

In preferred modes of invention in generic form:

A computer can have a display screen having a grid composed of numerous icons depicting colours, symbols, pictures and numbers.

A computer can be configured to receive user input indicating that the user has selected and then moved items to different locations within a grid on the display screen (with this movement occurring according to a predetermined sequence for password entry purposes).

Input can be conveyed to a computer system by a user touching, or by another means including contact with a stylus or finger, to indicate that the user has selected a sequence of icons within the grid on the screen, with this touch action happening in a recognized sequence.

The provision of visual or audio feedback by a computer system to a user can indicate that the computer system has recognized each individual action a user has completed.

A colour, symbol, picture or number that has been contacted by a user, can be returned to its original location in order to conceal the action of the user, so that an observer cannot easily observe the input actions of the user.

The system can also include the ability for a user to cancel an incorrect action.

A computer system can include the capacity to determine that the user input action is acceptable when compared with a predefined sequence of actions that the computer system requires to happen before authentication and the granting of access to services available on a device connected to the system (it being noted that while the device can in a preferred embodiment, including a phone, be portable, the device need not be portable but can instead be secured in place).

A computer system can have the capacity to store data in a system component managed by a memory control module of a device (the device being a phone in one embodiment) connected to the system in order that data that has been input into the device can be compared with predefined data as recorded and stored. The previous comparison enables a determination about the acceptability of a user's input actions. The predefined data for purposes of comparison can also be stored remotely as well as locally.

The system can include the ability to lock a mobile phone or other computer device for a period of time if a user fails to provide a valid input action after repeated login attempts, with this locking preferably happening after three failed login attempts.

The system can include the capacity for the raising of a security alert within the system network of the mobile phone network provider when a user of a device fails to provide a valid login input action on three consecutive occasions.

A further aspect of one embodiment of the present invention can include the ability for a mobile phone network provider to lock a mobile phone and disconnect the phone from the mobile phone network.

A computer system can include the capacity to grant access to a mobile phone or computer device of a user who is able to provide acceptable predefined input actions.

In a further preferred mode of invention in generic form, a login procedure can be used as login means for a user accessing an Internet web site, in which the embodiment can include some of the following features:

A web server can be configured to send HTML text and images to the Internet browser of a user.

A web browser can receive transmitted data and display a grid containing colours, symbols, images (pictures) and numbers on a computer screen.

A computer system can include as one component, a phone, which can collect input data from a user who is interacting with a web browser displayed on the phone's screen; the browser displaying on the screen, a grid of icons that can include colours, symbols, pictures (images) and numbers.

A computer system (that can include a phone, a laptop or a stationary desktop computer) can send data created by a user to a server and also receive input data from the server.

The server can authenticate the user data and grant or deny access to a web site.

A further preferred mode of invention in generic form can include an application (app) and further include the following features:

The application (app) can display colours, symbols and images (pictures) on the computer screen of a device.

User input can create data that is checked by a device that can include a mobile phone, laptop, tablet or a stationary desktop computer.

A computer system embodying one mode of invention can authenticate user data and participate in the granting or denial of access to an application on the basis of user input.

INDUSTRIAL APPLICABILITY

Figure 18:
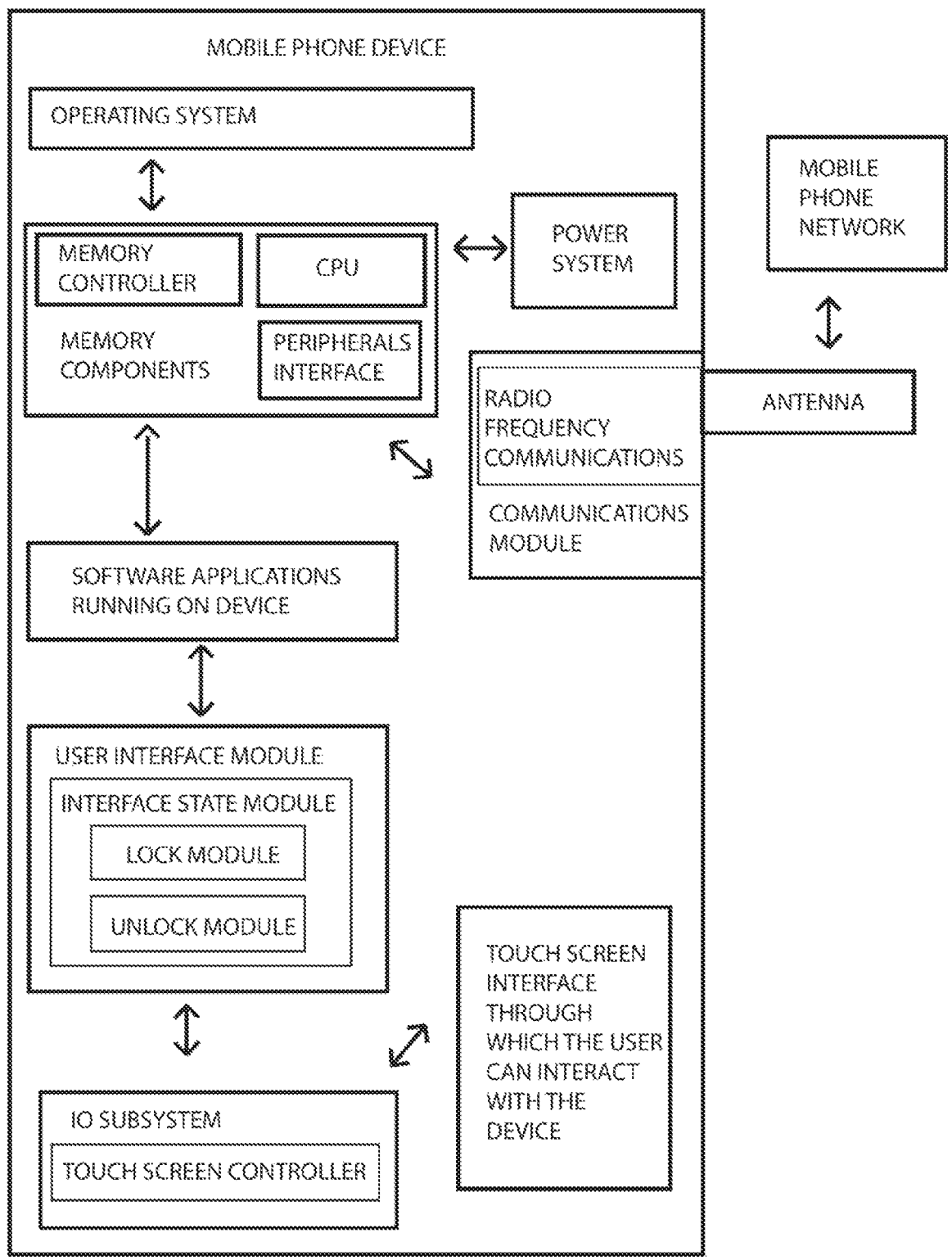
FIG. 18 shows a computer system in which embodiments of the present invention can be used to login into aspects of the system.

FIG. 18 shows a computer system in which embodiments of the present invention can be used industrially to login to the system.

Figure 19:
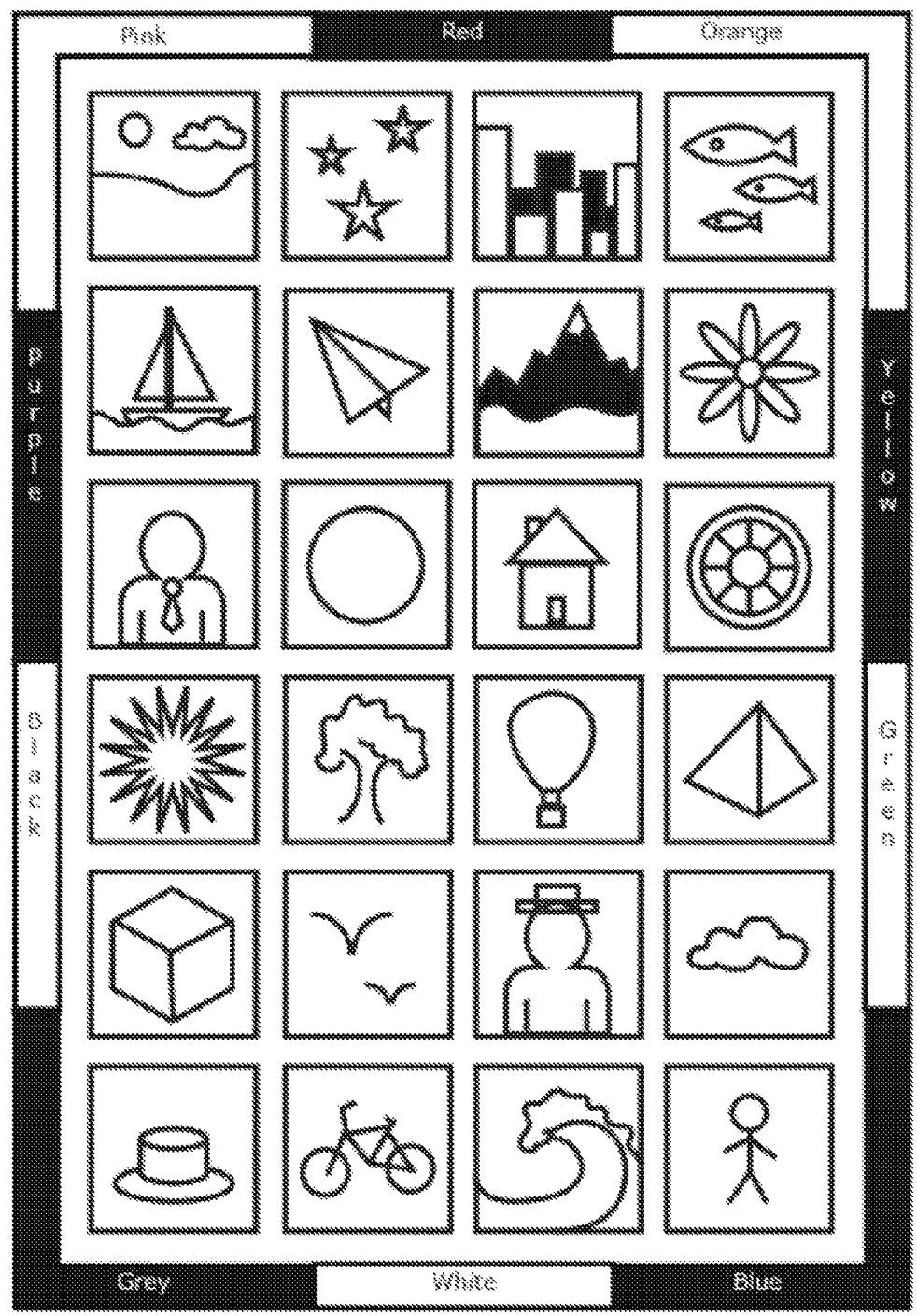
FIG. 19 shows a screen display according to one embodiment of the present invention, in use.

FIG. 19 shows a screen display according to one embodiment of the present invention in which pictographic icons displayed in squares can be arranged at random on the screen and in a further embodiment surrounding colours, that can be associated with the icons for password entry purposes, can also be arranged at random so as to render hand movements associated with password entry unpredictable and so making the entered password less susceptible to guessing by an unauthorized observer watching the hand movements.

In use, the system recited above can be further secured by way of a plurality of means including:

i) Determining a device's location in order to authenticate a password.

ii) Ensuring that passwords are of at least a predetermined length.

iii) Using a device's identifying indicia, including an IMEI number, as a further check upon authenticity of a password entry.

iv) Using biometric authentication (including facial or voice recognition) to verify the identity of a user of a device.

Copyright in drawings the subject of this application is reserved and remains the property of NOWWW.US Pty Ltd ACN 137 333 709 and its assigns.

What is claimed is:

1. An electronic system comprising an electronic screen, a computer readable memory, and a processor, software instructions being encoded on the computer readable memory and executable to perform operations including:

displaying a plurality of symbols positioned at individual coordinate locations on the electronic screen, an initial symbol arrangement being defined by predetermined appearances and the individual coordinate locations of the plurality of symbols;

providing secure password entry into the system by entering a plurality of password elements in a sequence defining a password, each password element entry operation including defining a drag and drop operation between source and destination coordinate locations to move a source symbol of the plurality of the symbols positioned at the source coordinate location into contact with a destination symbol of the plurality of the symbols positioned at the destination coordinate location, said source and destination coordinate locations being different each from the other, the entered password element defined by a combination of the source and destination symbols; and subsequent to each drag and drop operation moving the source symbol from the source coordinate location, returning the source symbol back to the source coordinate location, thereby restoring the initial symbol arrangement after completion of each drag and drop operation.

2. The electronic system of claim 1, wherein, when the drag and drop operation pauses in contact with an intermediate symbol positioned at an intermediate coordinate location displaced from the source and destination coordinate locations, the entered password element is further defined by the intermediate symbol.

3. The electronic system of claim 1, wherein the entered password element is defined exclusively by consideration of the source and destination symbols.

4. The electronic system of claim 1, wherein the operations of the software instructions further include randomizing the coordinate locations of each of the symbols to produce the initial symbol arrangement.

5. The electronic system of claim 1, wherein the symbols include at least a plurality of first symbols and a plurality of second symbols visually distinct from the first symbols, each password element defined by a combination of a first symbol and a second symbol.

6. The electronic system of claim 5, wherein the plurality of first symbols are collectively positioned in a first arrangement pattern, and the plurality of second symbols are collectively positioned in a second arrangement pattern visually distinct from the first arrangement pattern.

7. The electronic system of claim 1, wherein each password element entry operation further includes providing visual feedback indicating a password element selection.

8. The electronic system of claim 1, wherein each password element entry operation further includes providing audio feedback indicating a password element selection.

9. An electronic system comprising:
means for displaying a plurality of symbols positioned at individual coordinate locations on a display screen of a device connected to the system, an initial symbol arrangement being defined by predetermined appearances and the individual coordinate locations of the plurality of symbols;
means for providing secure password entry into the system by entering a plurality of password elements in a sequence defining a password, each password element entry operation including defining a drag and drop operation between source and destination coordinate locations to move a source symbol of the plurality of the symbols positioned at the source coordinate location into contact with a destination symbol of the plurality of the symbols positioned at the destination coordinate location, said source and destination coordinate locations being different each from the other, the entered password element defined by a combination of the source and destination symbols; and
means for, subsequent to each drag and drop operation moving the source symbol from the source coordinate location, returning the source symbol back to the source coordinate location, thereby restoring the initial symbol arrangement after completion of each drag and drop operation.

10. The electronic system of claim 9, wherein, when the drag and drop operation pauses in contact with an intermediate symbol positioned at an intermediate coordinate location displaced from the source and destination coordinate locations, the entered password element is further defined by the intermediate symbol.

11. The electronic system of claim 9, wherein the entered password element is defined exclusively by consideration of the source and destination symbols.

12. The electronic system of claim 9, further comprising means for randomizing the coordinate locations of each of the symbols to produce the initial symbol arrangement.

13. The electronic system of claim 9, wherein the symbols include at least a plurality of first symbols and a plurality of second symbols visually distinct from the first symbols, each password element defined by a combination of a first symbol and a second symbol.

14. The electronic system of claim 13, wherein the plurality of first symbols are collectively positioned in a first arrangement pattern, and the plurality of second symbols are collectively positioned in a second arrangement pattern visually distinct from the first arrangement pattern.

15. The electronic system of claim 9, wherein each password element entry operation further includes providing visual feedback indicating a password element selection.

16. The electronic system of claim 9, wherein each password element entry operation further includes providing audio feedback indicating a password element selection.

17. An electronic system for providing secure password entry into said electronic system using a swipe gesture, the electronic system comprising:
a display screen;
a computer readable memory; and
a processor configured to:
display on said display screen a plurality of indicia including at least a plurality of first indicia and a plurality of second indicia visually distinct from the first indicia, the plurality of first indicia having predetermined appearances and being positioned at individual coordinate locations to collectively form a first arrangement pattern, the plurality of second indicia having predetermined appearances and being positioned at individual coordinate locations to collectively form a second arrangement pattern visually distinct from the first arrangement pattern;
translate, by a drag and drop operation, a source indicia of said plurality of indicia initially positioned at a source coordinate location to a destination indicia of said plurality of indicia positioned at a destination coordinate location different from the source coordinate location, to thereby move said source indicia into contact with said destination indicia;
subsequent to contact of a pair of indicia including one of the first indicia and one of the second indicia, entering a password element defined by the pair of indicia;
subsequent to each drag and drop operation translating a selected indicia from an initial coordinate location, translate said selected indicia back to said initial coordinate location, thereby restoring the first and second arrangement patterns after completion of each drag and drop operation; and
subsequent to entry of a plurality of password elements in a sequence, authenticating a password defined by said sequence of password elements.

18. The electronic system of claim 17, wherein the plurality of first symbols are color symbols and the plurality of second symbols are number symbols.

19. The electronic system of claim 17, wherein the plurality of first symbols are pictures and the plurality of second symbols are number symbols.

20. The electronic system of claim 17, wherein the entered password element is defined exclusively by consideration of the source and destination indicia.

* * * * *